United States Patent
Jones et al.

(10) Patent No.: US 9,639,459 B2
(45) Date of Patent: May 2, 2017

(54) I/O LATENCY AND IOPS PERFORMANCE IN THIN PROVISIONED VOLUMES

(71) Applicant: International Business Machines Corporation, Armonk, NY (US)

(72) Inventors: Carl E. Jones, Tucson, AZ (US); Subhojit Roy, Pune (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 298 days.

(21) Appl. No.: 13/909,178

(22) Filed: Jun. 4, 2013

(65) Prior Publication Data
US 2014/0359245 A1    Dec. 4, 2014

(51) Int. Cl.
*G06F 12/00* (2006.01)
*G06F 12/02* (2006.01)
*G06F 12/0862* (2016.01)
*G06F 3/06* (2006.01)

(52) U.S. Cl.
CPC .......... *G06F 12/023* (2013.01); *G06F 3/0608* (2013.01); *G06F 3/0659* (2013.01); *G06F 3/0665* (2013.01); *G06F 3/0683* (2013.01); *G06F 12/0862* (2013.01); *G06F 2212/6028* (2013.01)

(58) Field of Classification Search
CPC ............... G06F 12/023; G06F 12/0862; G06F 2212/6028
See application file for complete search history.

(56) References Cited

U.S. PATENT DOCUMENTS

| | | | |
|---|---|---|---|
| 6,425,053 B1 * | 7/2002 | Considine | G06F 3/061 710/74 |
| 7,949,847 B2 | 5/2011 | Murase | |
| 7,971,025 B2 | 6/2011 | Murase et al. | |
| 8,127,096 B1 | 2/2012 | Chatterjee et al. | |
| 8,250,284 B2 | 8/2012 | Nakamichi et al. | |

(Continued)

OTHER PUBLICATIONS

3GEN Data Systems, "3Gen Dynamic Thin Provisioning Discussion—Whitepaper" Aug. 16, 2011, [online], [retrieved on Sep. 13, 2012]. Retrieved from the Internet <URL: http://www.3gendata.com/whitepaper/3Gen_Dynamic_Thin_white_paper.pdf>.

(Continued)

*Primary Examiner* — David X Yi
*Assistant Examiner* — Alan Otto
(74) *Attorney, Agent, or Firm* — Anthony Canale; Andrew M. Calderon; Roberts Mlotkowski Safran Cole & Calderon, P.C.

(57) ABSTRACT

A storage system receives an anticipatory write command corresponding to a potential subsequent write command to be received by the storage system, wherein the anticipatory write command indicates an anticipated region of logical address space that may be written to by the potential subsequent write command. The storage system determines that physical storage is not allocated to the anticipated region of logical address space. The storage system allocates physical storage to the anticipated region of logical address space from a pool of available storage managed by the storage system. The storage system creates an association between the anticipated region of logical address space and the allocated physical storage in a virtual-to-physical mapping.

17 Claims, 4 Drawing Sheets

(56) References Cited

U.S. PATENT DOCUMENTS

2007/0260842 A1* 11/2007 Faibish et al. ............... 711/170
2008/0229045 A1*  9/2008 Qi ........................ G06F 3/0605
                                                  711/170
2011/0264887 A1* 10/2011 Craske ............... G06F 12/0862
                                                  711/205
2012/0203998 A1     8/2012 Acedo et al.

OTHER PUBLICATIONS

Tim Warden, "Storage Virtualization | FAQs & Discussions" Nov. 17, 2006, Updated Jul. 3, 2010, [online], [retrieved on Mar. 13, 2013]. Retrieved from the Internet <URL: http://www.las-solanas.com/storage_virtualization/thin_provisioning.php>.

* cited by examiner

I/O LATENCY AND IOPS PERFORMANCE IN THIN PROVISIONED VOLUMES

BACKGROUND

The present invention relates generally to the field of virtualized storage systems, and more particularly, to pre-allocating resources and pre-caching virtual-to-physical mappings in thinly provisioned storage systems.

Thin provisioning is a virtualization method for optimizing storage allocation by presenting a logical address space that is larger than the physical storage actually available. Implementing thin provisioning on a storage system may, for example, present applications with an address space that represents 10 TB of storage when, in fact, there are only 2 TB of actual, physical, storage in the storage system. A storage controller may control a plurality of physical storage devices (hard disks, solid state disks, tapes, etc.) in the storage system and interface between the physical storage devices and logical address space presented to a user. A storage system that uses thin provisioning may be referred to herein as a thinly provisioned storage system.

A thinly provisioned storage system allocates the physical storage to the logical address space when data is actually written by an application for a first time to the logical address space. Thus, for example, a first WRITE operation to an address range in the logical address space alerts the storage controller that fresh physical storage must be allocated. The storage controller allocates enough physical storage to fulfill the WRITE operation, and associates the allocated physical storage with the logical address range. Data associated with the WRITE operation is then written to the logical address range, now backed by physical storage.

Physical storage is allocated to the logical address space in predefined block sizes. Hence, mapping between virtual and physical space requires separate map entries for each allocated block of physical storage. A "block," as used herein, indicates a smallest extent or unit of allocatable physical storage space. Analogous terms used by different storage products include "allocation unit," "storage extent," "grain," "chunk," and "partition." If a WRITE command requires less storage space than is allocated by block size, space efficiency can be lost. Though space efficiency can be gained with smaller block sizes, the map becomes increasingly large as block size is reduced. Take, for example, a block size of 8 k. The number of mapping entries for a 1 TB sized virtual disk would be 1 TB/8 k=$2^{27}$, or about 128 million entries. If each entry is 4 bytes, the total map size for the virtual disk is around 512 MB. If multiple virtual disks exist, the map size can easily run into multiple Gigabytes.

SUMMARY

Embodiments of the present invention disclose a method, computer program product, and system for pre-allocating resources to a virtual volume. A storage system receives an anticipatory write command corresponding to a potential subsequent write command to be received by the storage system, wherein the anticipatory write command indicates an anticipated region of logical address space that may be written to by the potential subsequent write command. The storage system determines that physical storage is not allocated to the anticipated region of logical address space. The storage system allocates physical storage to the anticipated region of logical address space from a pool of available storage managed by the storage system. The storage system creates an association between the anticipated region of logical address space and the allocated physical storage in a virtual-to-physical mapping.

DETAILED DESCRIPTION

Embodiments of the present invention recognize that large maps for thinly provisioned storage systems cannot typically be cached in RAM, and it can be time expensive if there is a map fault (cache miss) during Input/Output (I/O) operations. Additionally, allocation of resources and creating new map entries during first WRITEs can also be expensive operations, especially for I/O intensive applications. To improve I/O latency and IOPs (Input/Output Operations Per Second) performance, embodiments of the present invention provide a thinly provisioned storage system the ability to receive anticipatory READ and WRITE commands, without associated data to be transferred, from an application prior to actual READ and WRITE commands, with associated data to be transferred. These anticipatory commands are referred to herein as a "stub READ" and a "stub WRITE", respectively.

The receipt of a stub WRITE command to a virtual volume allows the storage system to allocate physical storage to the virtual volume in advance of an actual WRITE command from an application. This has the additional advantage of preventing the creation of a new map entry, e.g., in a B-Tree map, during heavy I/O load conditions. In the case that physical storage space is already allocated to logical address space of the virtual volume, the stub WRITE will also ensure that the relevant portion of the virtual-to-physical mapping is cached prior to the actual WRITE. If a READ miss occurs, i.e., the virtual-to-physical mapping is not currently in-memory, the storage system typically generates an additional READ to fetch the corresponding portions of the mapping into memory, increasing I/O latency. Use of the stub READ command ensures that the relevant portion of the virtual-to-physical mapping is cached in-memory before the actual READ command is received on the virtual volume.

Implementation of such embodiments may take a variety forms, and exemplary implementation details are discussed subsequently with reference to the Figures.

Figure 1:
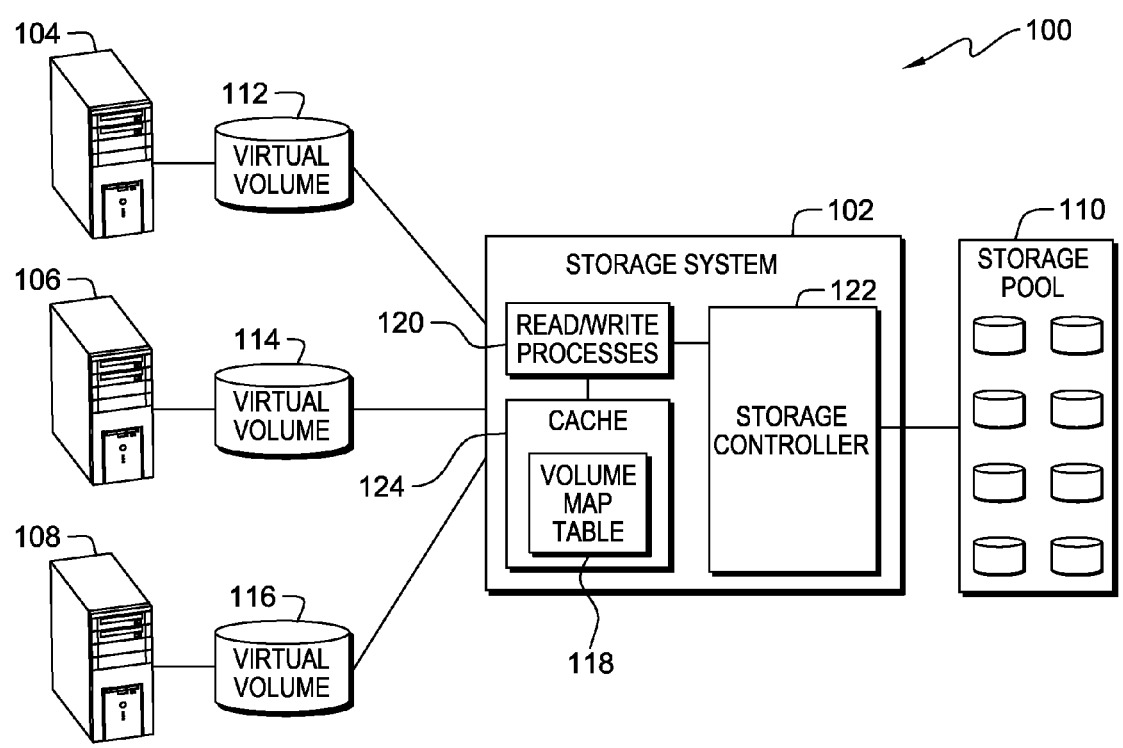
FIG. 1 is a functional block diagram illustrating a distributed data processing environment, in accordance with an embodiment of the present invention.

FIG. 1 is a conceptual block diagram illustrating a distributed data processing environment, generally designated 100, in which an embodiment of the present invention can be implemented. Distributed data processing environment 100 depicts storage system 102 communicatively coupled through various connections and protocols, for example, a wide-area network (WAN) or local-area network (LAN), to application servers 104, 106, and 108. Application servers 104, 106, and 108 host application logic and may each represent a distinct computer system. In an alternate embodiment, one or more of application servers 104, 106, and 108 may be implemented as virtual machines. Each of application servers 104, 106, and 108 rely, at least partially, on storage provided by storage system 102.

Storage system 102 is a shared storage infrastructure providing storage for a plurality of applications running on different servers. Storage system 102 manages a collection of physical storage resources as a single pool of storage, e.g., storage pool 110. Storage pool 110 may include, in a non-exhaustive list, hard disk drives, solid-state drives, optical disks, and tape. Virtual volumes 112, 114, and 116 are created from storage pool 110 as logical entities. From an application's standpoint, a virtual volume typically looks no different from any other storage volume. Each virtual volume's I/O is typically actively load balanced, with I/O activity being spread evenly across the physical resources of storage pool 110.

In one implementation, each created virtual volume initially comprises only a volume header, identifying the volume, and a pointer to the virtual-to-physical mapping, e.g., volume map table 118. Volume map table 118 is used to keep track of where allocated blocks physically exist. When one of application servers 104, 106, and 108 writes a block to a respective virtual volume 112, 114, and 116, storage system 102 hashes volume map table 118 to determine where in storage pool 110 the block physically resides. If the block has not yet been allocated, the necessary storage space is allocated to the virtual volume from storage pool 110. I/O activity may be handled by one or more processes, functions, and/or routines describing a series of actions to accomplish the desired read or write activity. These are collectively referred to herein as read/write processes 120. In one embodiment, read/write processes 120 communicate with storage controller 122 and volume map table 118 to effect desired movement of data. Volume map table 118 is typically kept in-memory, e.g., in cache 124, however, for larger maps, only portions of volume map table 118 may be kept in cache 124 with relevant portions of the map pulled from physical storage as necessary.

Storage controller 122 acts as an interface between applications and storage system 102 and may be responsible for performing a wide range of functions for the storage system. Storage controller 122 handles movement of data. In one embodiment, read/write processes 120 may be processes on or controlled by storage controller 122.

Figure 2:
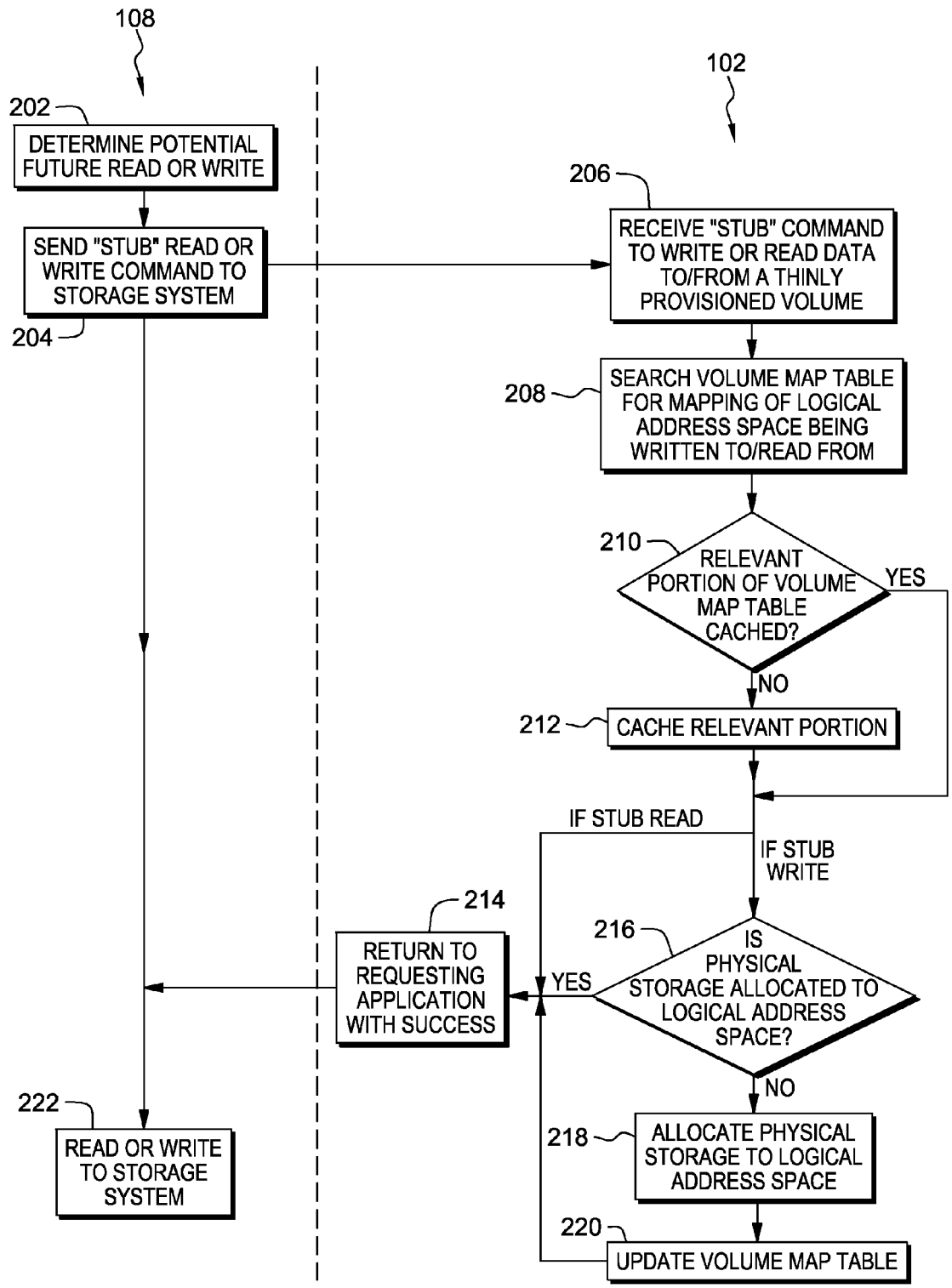
FIG. 2 is a flow diagram illustrating the processing of I/O activity between an application server and a storage system in the distributed data processing environment, in accordance with an illustrative embodiment of the present invention.

FIG. 2 is a flow diagram illustrating the processing of I/O activity between an application server, in this case application server 108, and storage system 102, in accordance with an illustrative embodiment of the present invention. The process described as performed by application server 108 may actually be implemented by an application executing on application server 108. Similarly, the process described as performed by storage system 102 is representative of logical operations performed by read/write processes 120 on storage system 102.

At 202, application server 108 determines a potential future READ or WRITE to virtual volume 116. For embodiments of the present invention to perform most efficiently, stub READ and stub WRITE commands should be sent some time prior to an actual READ or WRITE command. Therefore, applications aware of upcoming I/O patterns may realize greater benefit from embodiments of the present invention. More specifically, an ideal application making use of embodiments of the present invention may know or predict that it will send one or more READ and/or WRITE commands to a specific set of virtual addresses within a known time. A database log replay, for example, may be scheduled to occur at a particular time every day. Such an application may examine log entries to determine tables, rows, and columns that will be updated as part of the replay. An examination of the logs prior to the log replay would allow the application to send stub WRITE commands when new records will be added to a table and stub READ commands for tables that are likely to be accessed. In a simpler implementation, an application could examine prefetched instructions for upcoming READ and WRITE commands. In addition to scheduled operations, applications may also employ various I/O pattern detection techniques to predict I/O access patterns. The file system is typically aware of the next set of free blocks that will be used for new allocations.

At 204, application server 108 sends a stub READ or WRITE command to storage system 102. There is no additional data transfer associated with stub READ and stub WRITE calls. Instead, stub READ and WRITE commands inform storage system 102 that a READ or WRITE of a specified size and starting from a particular offset or logical block address (LBA) is expected to follow.

In a first embodiment, new "stub" commands may be defined for the relevant communications interface. For example, stub READ and stub WRITE SCSI (small computer system interface) commands can be defined. Arguments for these commands could include Start LBA and Size (similar to standard SCSI READ and WRITE commands), however, the commands would not have associated data to be written or require return of data. Recognizing that defining a new command may require third party approval, by a standards committee for example, a second embodiment allows for overloading an existing command. The WRITE-SAME SCSI command, for example, is already overloaded to deallocate space on thinly provisioned volumes given a certain set of conditions. One embodiment of the present invention further overloads the WRITESAME command to act as a stub WRITE under another set of conditions. A more detailed discussion regarding an implementation utilizing an overloaded WRITESAME command is provided with regard to FIG. 3.

In another embodiment, and applicable to any of the previously indicated implementations, a stub READ or WRITE command can contain a list of LBAs and sizes of regions that are predicted to be, respectively, read or written. Such an embodiment would allow multiple regions to be cached and/or pre-allocated with a single stub command. This is especially effective for applications capable of determining or predicting a large number of subsequent READs and/or WRITEs.

In yet another embodiment, existing READ and WRITE commands can be altered or redefined to accept additional stub READ and WRITE parameters. More specifically, in addition to the required arguments for a READ or WRITE, one or more LBAs and sizes may be listed that correspond to potential future READs or WRITEs, allowing an application to "piggyback" stub READ and WRITE commands onto existing I/O commands.

With regard to timing, an application on application server 108 can determine a potential future READ or WRITE and send a stub READ or WRITE to storage system 102 any time prior to the actual READ or WRITE commands. In one embodiment, the application can be set to send stub commands when frequency of I/O operations is reduced. For example, a user of the application could select a time for the application to send stub commands when the frequency of I/O operations is expected to be low, e.g., overnight. The application could, in such an embodiment, determine and send stub commands for anticipated READs and WRITEs for the following day. In another example, an application capable of determining I/O access patterns can select a time based on an historical pattern of I/O operations.

At 206, storage system 102 receives the stub command to write or read data to or from a thinly provisioned volume. Storage system 102 searches volume map table 118, in cache 124, for a mapping of logical address space to be written to or read from (208), and determines whether the relevant portion of volume map table 118 is cached (decision 210). If the relevant portion of volume map table 118 is not cached ("no" branch, decision 210), storage system 102 caches the relevant portion (212), for example, by pulling the relevant portion from physical storage.

If the stub command received is a stub READ, subsequent to caching the relevant portion, or alternatively, subsequent to determining that the relevant portion of volume map table 118 is cached ("yes" branch, decision 210), storage system 102 returns an acknowledgement of a successful stub READ to application server 108 (214).

If the stub command received is a stub WRITE, subsequent to caching the relevant portion, or alternatively, subsequent to determining that the relevant portion of volume map table 118 is cached ("yes" branch, decision 210), storage system 102 determines whether physical storage is allocated to the logical address space of virtual volume 116 referenced in the stub WRITE (decision 216). If physical storage is allocated to the logical address space ("yes" branch, decision 216), storage system 102 returns an acknowledgement of a successful stub WRITE (214). If, however, storage system 102 determines that physical storage has not yet been allocated ("no" branch, decision 216), storage system 102 allocates one or more blocks from physical storage (218). The number of blocks allocated depends on the size indicated by the stub WRITE. Storage system 102 updates volume map table 118 (220) to indicate the association between the logical address space and the freshly allocated physical storage, and returns an acknowledgment of a successful stub WRITE (214).

A person of ordinary skill in the art will recognize that in the case where multiple LBAs and sizes are sent in a single stub command corresponding to a plurality of determined or predicted future READs or WRITEs, the above described process may be implemented for each LBA and size set.

At 222, some time subsequent to an acknowledgment of success, application server 108 performs the determined or predicted READ or WRITE. With relevant portions of volume map table 118 in memory, and necessary blocks of physical storage allocated to virtual volume 116, I/O latency is minimal and IOPs performance is not negatively impacted. It should be noted that depicted actions performed by application server 108 represent only the actions most relevant to read/write processes 120 of storage system 102. Any number of additional operations may be performed by application server 108 in between and concurrent with the depicted actions.

Figure 3:
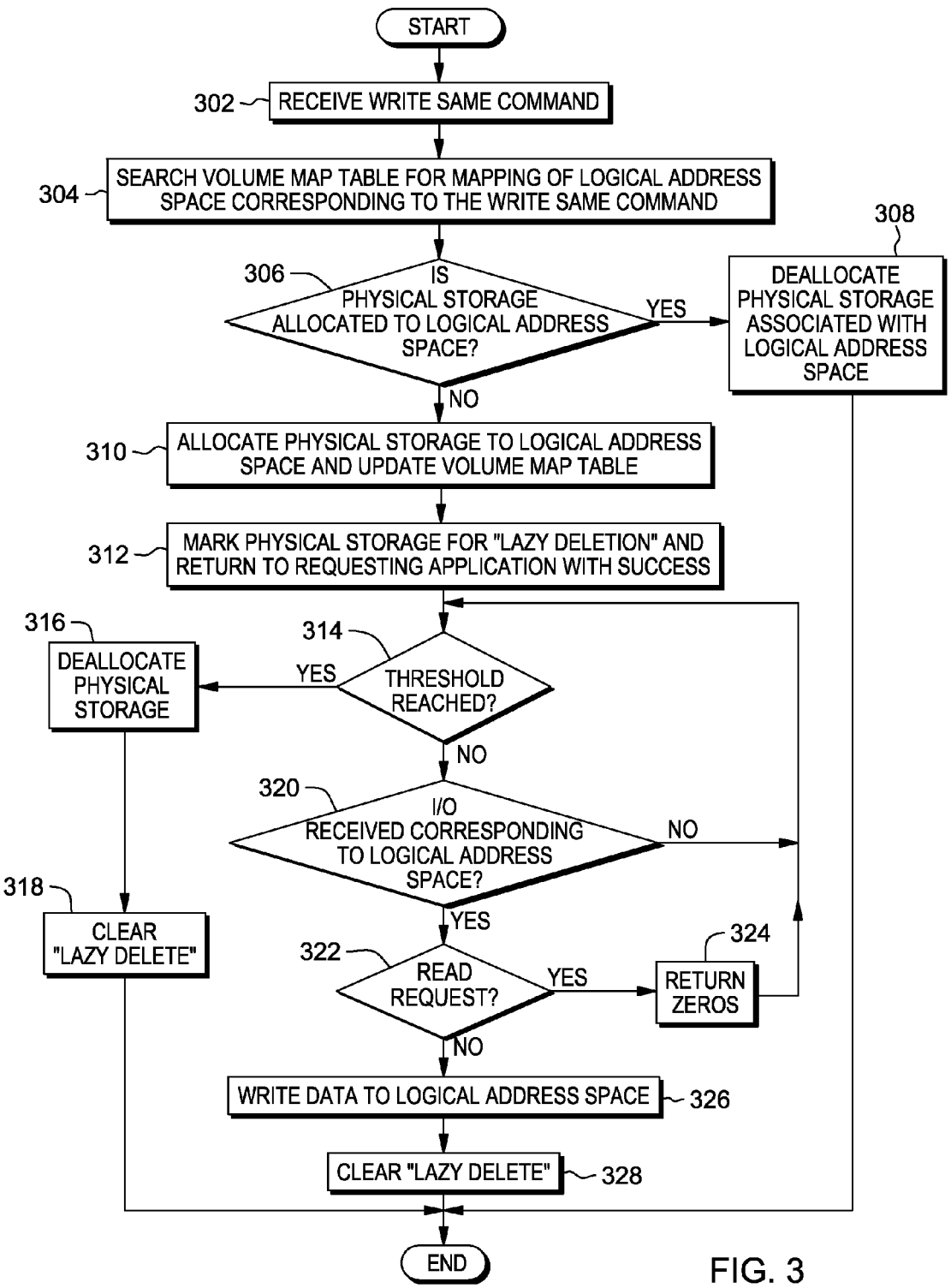
FIG. 3 is a flow diagram describing an implementation of the present invention utilizing an overloaded WRITESAME command.

FIG. 3 is a flow diagram describing an implementation of the present invention utilizing an overloaded WRITESAME command. Persons of ordinary skill in the art will recognize that actions described with respect to FIG. 3 may apply equally to utilization of a different overloaded command.

At 302, storage system 102 receives a WRITESAME command. WRITESAME is a SCSI command that in traditional use initializes a virtual disk by instructing blocks of a virtual disk to '0'. An overloaded WRITESAME command has been previously used in thin provisioning to release allocated physical storage back to the free pool of physical storage. Similar to embodiments using newly defined stub WRITE commands, a received WRITESAME command specifies a starting LBA and a desired size.

At 304, storage system 102 searches volume map table 118 for a mapping of logical address space corresponding to the starting LBA and size parameters received in the WRITESAME command. In one embodiment, if physical storage is allocated to the logical address space ("yes" branch, decision 306), storage system 102 deallocates the physical storage associated with the logical address space back to storage pool 110 (308) as is current practice. In an alternate embodiment, storage system 102 may not implement deallocation functionality through an overloaded WRITESAME command. If, however, physical storage is not allocated to the logical address space ("no" branch, decision 306), storage system 102 may receive this as an indication of logical address space intended to be used by the sending application, and allocate physical storage space, e.g., from storage pool 110, to the logical address space and update volume map table 118 accordingly (310).

At 312, storage system 102 marks the allocated physical storage for "lazy deletion" and returns an acknowledgment of a successful stub WRITE. "Lazy deletion," as used herein, refers to an indication of allocated physical storage space that should be deallocated if not written to within a threshold amount of time. Especially useful for applications using a predictive approach to generate stub WRITEs, lazy deletion ensures that incorrectly predicted WRITEs do not permanently allocate unnecessary resources to a virtual volume. As such, implementations utilizing newly defined stub WRITE commands would equally benefit from, and may also incorporate, lazy deletion functionality. The threshold amount of time may be a default setting, or alternatively, may be entered by a system administrator.

In one implementation, an additional parameter in volume map table 118 may define a "lazy delete" field and an expiration field for all mapping entries. When physical storage is allocated based on a WRITESAME command (or other stub WRITE implementation), storage system 102 may flag the lazy delete field of newly mapped entries and, based upon the threshold amount of time, enter the time (e.g., with reference to a system clock) at which the threshold amount of time expires. Another implementation may create a separate table specifically for tracking allocated physical storage space marked for lazy deletion.

At decision 314, storage system 102 determines whether the threshold has been reached. In one embodiment, storage system 102 periodically checks for allocated physical storage marked for lazy deletion. Storage system 102 can compare the time stored in the expiration field to the system clock to determine if the threshold has been reached. One of ordinary skill in the art will recognize that any number of schemas for flagging entries and tracking time may be used.

If storage system 102 determines that the threshold has been reached ("yes" branch, decision 314), storage system 102 deallocates the physical storage space back to storage pool 110 (316), and clears the lazy delete field (318). If storage system 102 determines that the threshold has not been reached ("no" branch, decision 314), storage system 102 continues in a holding pattern waiting to receive I/O from applications and periodically checking the threshold.

If storage system 102 determines that I/O is received corresponding to the logical address space ("yes" branch, decision 320), and determines that the I/O is a READ ("yes" branch, decision 322), storage system 102 returns zeros (324) to the requesting application and continues to periodically check the threshold. If, however, storage system 102 determines that the I/O is a WRITE to the logical address space ("no" branch, decision 322), storage system 102 writes the associated data (326), and removes the flag from the lazy delete field (328).

Figure 4:
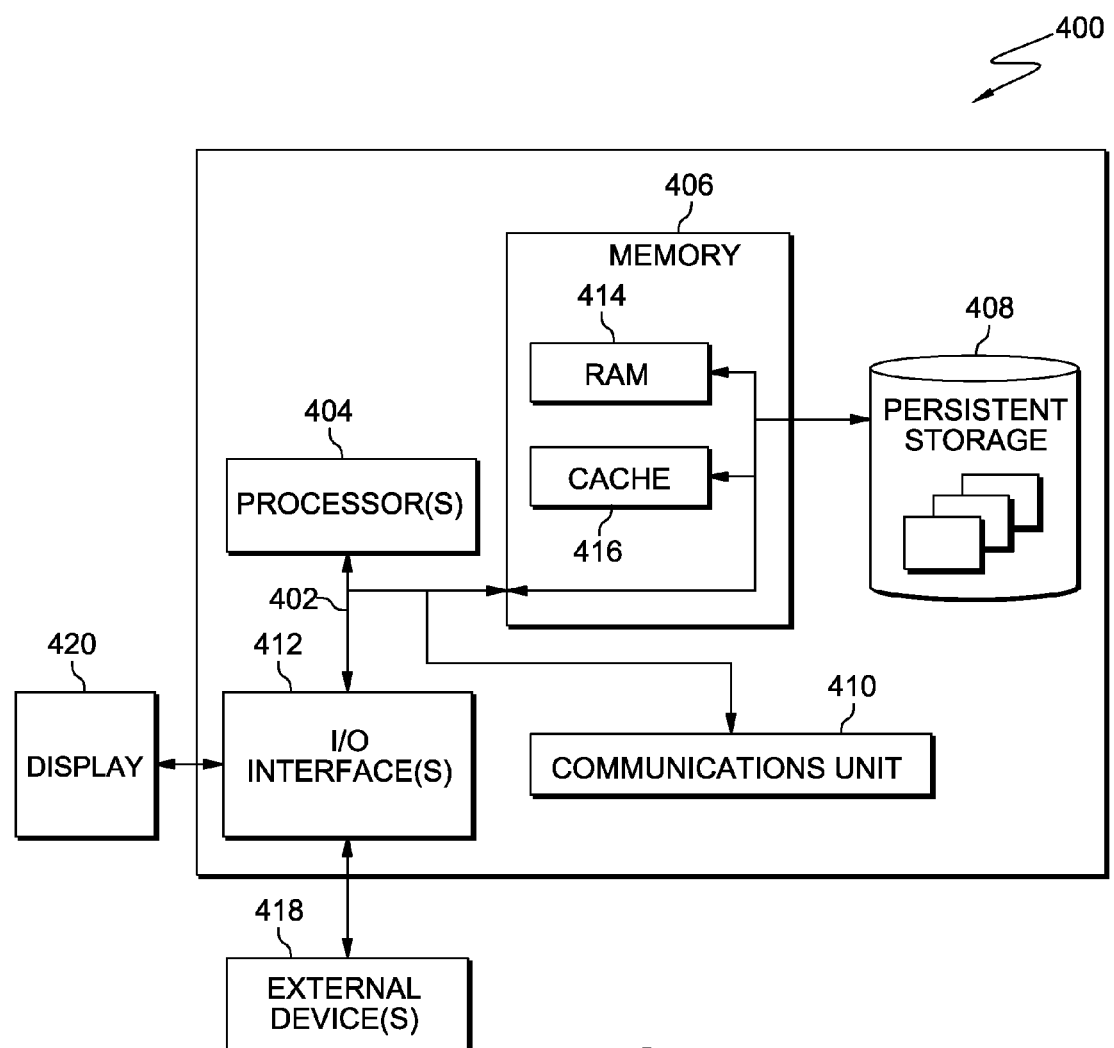
FIG. 4 depicts a block diagram of components of a data processing system, representative of any computing system within the storage system of the distributed data processing environment, in accordance with an illustrative embodiment of the present invention.

FIG. 4 depicts a block diagram of components of data processing system 400, representative of any computing system within storage system 102 operating read/write processes 120 and storage controller 122, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Data processing system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416, which may include cache 124. In general, memory 406 can include any suitable volatile or non-volatile computer-readable storage media. Memory 406 and persistent storage 408 may be logically partitioned and allocated to one or more virtual machines and/or virtual volumes.

Computer programs and processes are stored in persistent storage 408 for execution by one or more of the respective computer processors 404 via one or more memories of memory 406. For example, processes implementing and managing thinly provisioned volumes may be stored in persistent storage 408. In one embodiment, persistent storage 408 may part of storage pool 110. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including other computing systems of storage system 102. In these examples, communications unit 410 includes one or more network interface cards. Communications unit 410 may provide communications through the use of either or both physical and wireless communications links. Computer programs and processes may be downloaded to persistent storage 408 through communications unit 410.

I/O interface(s) 412 allows for input and output of data with other devices that may be connected to data processing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 may also connect to a display 420.

Display 420 provides a mechanism to display data to a user and may be, for example, a computer monitor.

In one implementation, embodiments of the present invention may be practiced in distributed cloud computing environments where tasks are performed by remote processing devices that are linked through a communications network. In a distributed cloud computing environment, program modules may be located in both local and remote computer system storage media including memory storage devices.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. For example, storage system 102 may offer storage resources, e.g., virtual volumes 112, 114, and 116, to clients of the cloud computing environment, e.g., application servers 104, 106, and 108. In another example, application servers 104, 106, and 108 may be nodes within the cloud computing environment and offer application services to external clients. Offered application services may be backed by storage resources of storage system 102.

The cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing environment may provide a set of functional abstraction layers. It should be understood in advance that the components, layers, and functions described herein are intended to be illustrative only and embodiments of the invention are not limited thereto.

A first functional abstraction layer may be a hardware and software layer including hardware and software components. With reference to an embodiment of the present invention, data processing system 400 within storage system 102 and storage resources provided in storage pool 110 may be included in this layer. Additional examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

A second functional abstraction layer may be a virtualization layer providing an abstraction layer from which the following examples of virtual entities may be provided: virtual servers; virtual storage; virtual networks, including virtual private networks; virtual applications and operating systems; and virtual clients. Where embodiments of the present invention operate in a cloud computing environment, virtual volumes 112, 114, and 116 serve as examples of provided virtual storage. Application servers 104, 106, and 108 may also be provided as virtual servers to one or more clients of the cloud computing environment.

A third functional abstraction layer may be a management layer providing the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A fourth abstraction layer may be a workloads layer providing examples of functionality for which the cloud computing environment may be utilized. Examples of workloads and functions which may be provided from this layer include: mapping and navigation; software development and lifecycle management; virtual classroom education delivery; data analytics processing; and transaction processing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   receiving, at a storage system, an anticipatory write command corresponding to a potential subsequent write command to be received by the storage system, wherein the anticipatory write command indicates an anticipated write region of logical address space that may be written to by the potential subsequent write command;
   determining, by one or more computer processors, that physical storage is not allocated to the anticipated write region of logical address space;
   allocating physical storage to the anticipated write region of logical address space from a pool of available storage managed by the storage system;
   creating an association between the anticipated write region of logical address space and the allocated physical storage in a virtual-to-physical mapping, wherein the virtual-to-physical mapping occurs prior to receiving a subsequent write command;
creating a single stub command that contains a list of logical block addresses and sizes of regions to allow for multiple regions to be cached and pre-allocated by the single stub command; and
marking the physical storage allocated to the anticipated write region of logical address space to be deallocated after a specified duration of time has passed,
wherein if the specified duration of time has not passed, a holding pattern is established in which a periodic checking of time occurs to determine if the specified duration of time has passed, and
during the holding pattern if an input/output is received corresponding to the logical address space and it is determined that the input/output is a read command, zeros are returned to a requesting application while the periodic checking of time continues, and if the input/output is determined to be a write command, the holding pattern ceases and associated data of the write command is written and a flag from a lazy delete field is removed.

2. The method of claim 1, further comprising:
receiving, at the storage system, an anticipatory read command corresponding to a potential subsequent read command to be received by the storage system, wherein the anticipatory read command indicates an anticipated read region of logical address space from which data may be read by the potential subsequent read command;
determining, by one or more computer processors, that a virtual-to-physical mapping, associating the anticipated read region of logical address space with physical storage, is not cached in memory; and
caching at least the virtual-to-physical mapping, associating the anticipated read region of logical address space with physical storage, in memory.

3. The method of claim 1, further comprising:
subsequent to allocating physical storage to the anticipated write region of logical address space, receiving the subsequent write command, wherein the subsequent write command instructs data to be written to the anticipated write region of logical address space; and
writing the data to the anticipated write region of logical address space.

4. The method of claim 1, further comprising:
receiving the subsequent write command instructing data to be written to the anticipated write region of logical address space, and in response, unmarking the physical storage allocated to the anticipated write region of logical address space.

5. The method of claim 1, further comprising:
determining, by one or more computer processors, that the specified duration of time has passed; and
deallocating the physical storage allocated to the anticipated write region of logical address space.

6. The method of claim 1, further comprising:
prior to receiving the anticipatory write command:
an application determining the potential subsequent write command to be issued by the application;
the application creating the anticipatory write command based on the determined potential subsequent write command; and
the application sending the anticipatory write command to the storage system.

7. The method of claim 6, further comprising the application selecting a time to send the anticipatory write command to the storage system based on historical input/output patterns of the application.

8. The method of claim 1,
wherein the anticipatory write command is an overloaded write same command; and
wherein receipt of an overloaded write same command indicates to the storage system that if logical address space referenced by a write same command is associated with physical storage, the storage system should deallocate the physical storage, and if logical address space referenced by the write same command is not associated with physical storage, the storage system should allocate physical storage to the referenced logical address space, wherein the write same command specifies a starting logical block address and a desired size of the physical storage.

9. A computer system comprising:
one or more computer processors;
one or more computer-readable storage medium;
program instructions, stored on at least one of the one or more computer-readable storage medium for execution by at least one of the one or more computer processors, the program instructions comprising:
program instructions to receive an anticipatory write command corresponding to a potential subsequent write command to be received by the computer system, wherein the anticipatory write command indicates an anticipated write region of logical address space that may be written to by the potential subsequent write command;
program instructions to determine that physical storage is not allocated to the anticipated write region of logical address space;
program instructions to allocate physical storage to the anticipated write region of logical address space from a pool of available storage from the one or more computer-readable storage medium;
program instructions to create an association between the anticipated write region of logical address space and the allocated physical storage in a virtual-to-physical mapping, wherein the virtual-to-physical mapping occurs prior to receiving a subsequent write command;
program instructions to predict input/output access patterns which allows the computer system to be aware of a next set of physical storage that will be used for new allocations; and
program instructions to mark the physical storage allocated to the anticipated write region of logical address space to be deallocated after a specified duration of time has passed,
wherein if the specified duration of time has not passed, a holding pattern is established in which a periodic checking of time occurs to determine if the specified duration of time has passed, and
during the holding pattern if an input/output is received corresponding to the logical address space and it is determined that the input/output is a read command, zeros are returned to a requesting application while the periodic checking of time continues, and if the input/output is determined to be a write command, the holding pattern ceases and associated data of the write command is written and a flag from a lazy delete field is removed.

10. The computer system of claim 9, further comprising program instructions, stored on at least one of the one or more computer-readable storage medium for execution by at least one of the one or more computer processors, to:

receive an anticipatory read command corresponding to a potential subsequent read command to be received by the computer system, wherein the anticipatory read command indicates an anticipated read region of logical address space from which data may be read by the potential subsequent read command;

determine that a virtual-to-physical mapping, associating the anticipated read region of logical address space with physical storage, is not cached in memory; and cache at least the virtual-to-physical mapping, associating the anticipated read region of logical address space with physical storage, in memory.

11. The computer system of claim 9, further comprising program instructions, stored on at least one of the one or more computer-readable storage medium for execution by at least one of the one or more computer processors, to:

subsequent to allocating physical storage to the anticipated write region of logical address space, receive the subsequent write command, wherein the subsequent write command instructs data to be written to the anticipated write region of logical address space; and write the data to the anticipated write region of logical address space.

12. The computer system of claim 9, further comprising program instructions, stored on at least one of the one or more computer-readable storage medium for execution by at least one of the one or more computer processors, to:

receive the subsequent write command instructing data to be written to the anticipated write region of logical address space, and in response, unmark the physical storage allocated to the anticipated write region of logical address space.

13. The computer system of claim 9, further comprising program instructions, stored on at least one of the one or more computer-readable storage medium for execution by at least one of the one or more computer processors, to:

determine that the specified duration of time has passed; and in response to determining that the specified duration of time has passed, deallocate the physical storage allocated to the anticipated write region of logical address space.

14. A computer program product comprising:

one or more non-transitory computer-readable storage medium;

program instructions, stored on the one or more non-transitory computer-readable storage medium, the program instructions comprising:

program instructions to receive, at a storage system, an anticipatory write command corresponding to a potential subsequent write command to be received by the storage system, wherein the anticipatory write command indicates an anticipated write region of logical address space that may be written to by the potential subsequent write command;

program instructions to determine that physical storage is not allocated to the anticipated write region of logical address space;

program instructions to allocate physical storage to the anticipated write region of logical address space from a pool of available storage managed by the storage system;

program instructions to create an association between the anticipated write region of logical address space and the allocated physical storage in a virtual-to-physical mapping, wherein the virtual-to-physical mapping occurs prior to receiving a subsequent write command;

program instructions to create a single stub command that contains a list of logical block addresses and sizes of regions to allow for multiple regions to be cached and pre-allocated by the single stub command;

program instructions to predict input/output access patterns which allows the computer system to be aware of a next set of physical storage that will be used for new allocations;

program instructions to alter a stub command to accept additional stub read and write parameters by listing logical block addresses and sizes which correspond to potential future reads and writes in addition to arguments for read and write commands; and program instructions to mark the physical storage allocated to the anticipated write region of logical address space to be deallocated after a specified duration of time has passed, wherein if the specified duration of time has not passed, a holding pattern is established in which a periodic checking of time occurs to determine if the specified duration of time has passed, and during the holding pattern if an input/output is received corresponding to the logical address space and it is determined that the input/output is a read command, zeros are returned to a requesting application while the periodic checking of time continues, and if the input/output is determined to be a write command, the holding pattern ceases and associated data of the write command is written and a flag from a lazy delete field is removed.

15. The computer program product of claim 14, further comprising program instructions, stored on the one or more computer-readable storage medium, to:

receive, at the storage system, an anticipatory read command corresponding to a potential subsequent read command to be received by the storage system, wherein the anticipatory read command indicates an anticipated read region of logical address space from which data may be read by the potential subsequent read command;

determine that a virtual-to-physical mapping, associating the anticipated read region of logical address space with physical storage, is not cached in memory; and cache at least the virtual-to-physical mapping, associating the anticipated read region of logical address with physical storage, in memory.

16. The computer program product of claim 14, further comprising program instructions, stored on the one or more computer-readable storage medium, to:

receive the subsequent write command instructing data to be written to the anticipated write region of logical address space, and in response, unmark the physical storage allocated to the anticipated write region of logical address space.

17. The computer program product of claim 14, further comprising program instructions, stored on the one or more computer-readable storage medium, to:

determine that the specified duration of time has passed; and in response to determining that the specified duration of time has passed, deallocate the physical storage allocated to the anticipated write region of logical address space.

* * * * *